J. H. DANVER & W. H. LOSE.
METHOD OF FORMING GUIDES FOR MOLDING APPARATUS.
APPLICATION FILED DEC. 11, 1908.
925,686.
Patented June 22, 1909.
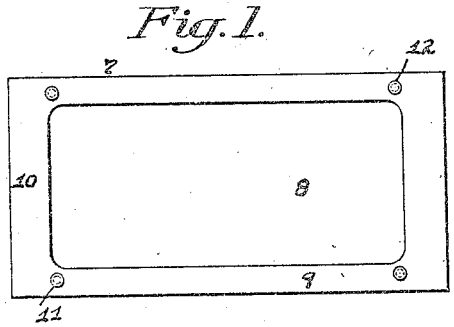
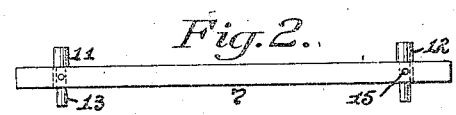
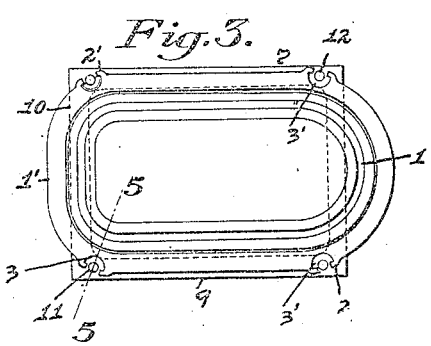
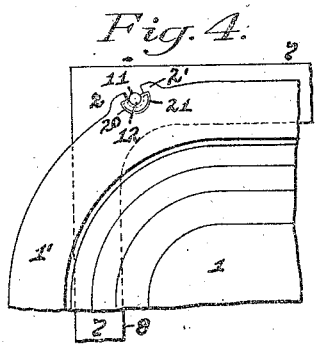
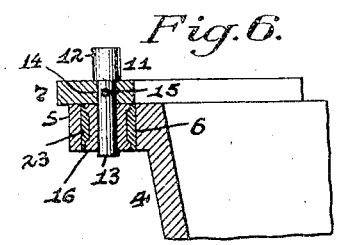
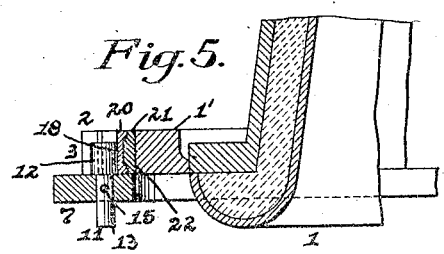
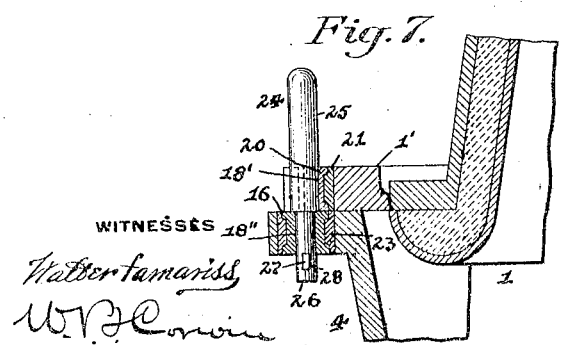
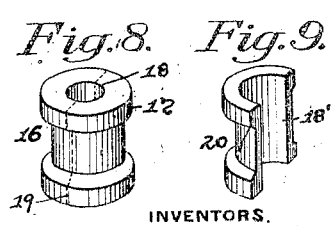
INVENTORS.
James H. Danver
William H. Lose,
By J. N. Cooke
Attorney.
WITNESSES

UNITED STATES PATENT OFFICE.

JAMES H. DANVER, OF BEAVER, AND WILLIAM H. LOSE, OF ZELIENOPLE, PENNSYLVANIA.

METHOD OF FORMING GUIDES FOR MOLDING APPARATUS.

No. 925,886.     Specification of Letters Patent.     Patented June 22, 1909.

Application filed December 11, 1908. Serial No. 467,082.

*To all whom it may concern:*

Be it known that we, JAMES H. DANVER and WILLIAM H. LOSE, residents of Beaver and Zelienople, respectively, in the counties of Beaver and Butler, respectively, and State of Pennsylvania, have invented a new and useful Improvement in Methods of Forming Guides for Molding Apparatus; and we do hereby declare the following to be a full, clear, and exact description thereof.

Our invention relates to a method of forming guides in flasks or patterns, and has special reference to such guides for use with the dowel pins generally employed in molding apparatus.

Heretofore in the use of guiding means in molding apparatus the guiding openings or holes for the dowel pins used on flasks or patterns to match or center the parts of the apparatus were generally formed in the flasks or patterns by casting or drilling, so that they would not register in a true line with each other, or would become worn in use, and thereby form molds which will form uneven thickness of metal when cast, when an even thickness was desired, as in the case of bath-tubs and other like hollow cast-ware.

The object of our invention is to overcome these objections and provide a cheap, simple and efficient method of forming guides in flasks or patterns whereby both parts of the molding apparatus to be matched will engage the dowel pins in a true and perfect line and so position the mold parts in proper relation with each other to form an even thickness of metal in the cast article through the molds formed thereby.

Our invention consists, generally stated, in the novel method of forming guides in flasks and patterns as hereinafter more specifically set forth and described and particularly pointed out in the claims.

To enable others skilled in the art to which our invention appertains to practice and use our improved method of forming guides in flasks or patterns, we will describe the same more fully, referring to the accompanying drawings, in which—

Figure 1 is a plan view of a jig for use in connection with our invention. Fig. 2 is a side elevation of the same. Fig. 3 is a plan view of a pattern for forming a bath-tub and showing the jig applied thereto. Fig. 4 is an enlarged plan view of a portion of the bath-tub pattern and jig. Fig. 5 is an enlarged sectional view of the same, taken on the line 5—5 Fig. 3. Fig. 6 is a like view of a portion of a flask showing the jig applied thereto. Fig. 7 is a sectional view of the pattern and flask showing the pattern guided to position on said flask. Fig. 8 is an enlarged perspective view of the spool employed. Fig. 9 is a like view of a severed portion of the spool.

Like symbols of reference herein indicate like parts in each of the figures of the drawing.

As illustrated in the drawings, our invention is illustrated generally in connection with apparatus for the casting of bath-tubs, in which 1 represents a pattern for forming the mold therefor and of the usual hollow shape having the lug portions 2 extending out from the match or stripping plate 1' around said pattern, and four of these portions are generally employed for such work. Two of these lug portions 2 are located on each side of the pattern 1 and near the ends thereof, and each is provided with an opening 3 formed in the same in any suitable manner, with an inner semi-circular portion 3' which terminates in a tongue 2' extending over each side of the same and formed on said lug portions. The usual drag flask for use in connection with the pattern 1 in forming these molds is shown at 4, which has the usual flange 5 extending out from the upper end of the same and provided with the openings or holes 6 through the same.

In carrying out our method a jig is employed, such as is shown at 7, which is preferably in the form of a frame having an opening 8 within and through the same and thereby forming the sides 9 and ends 10 thereon. At each of the four corners of the jig 7 is located a pin 11, which is provided with a circular enlarged portion 12 extending above said jig and with a circular contracted portion 13 thereon fitting within a circular hole 14 in said jig and extending below the same. These pins 11 are removably secured in place in the holes 14 of the jig 7 in any suitable manner, as by the pin or bolt 15 extending through said jig and the contracted portion 13 on said pins.

A spool is indicated at 16, which is preferably formed of metal, and is provided with a flange 17 extending out from each end of the same, such spool and flange being preferably of circular shape and having a circular opening or hole 18 through the same.

The manner of practicing and use of our improved method of forming guides for molding flasks or patterns is as follows:— In forming the guides for the pattern 1, two of such spools 16 are cut in half and on the dotted line 19 shown in Fig. 8, which will form four halves or segmental bearing portions 20, such as like the one in Fig. 9, and after the jig 7 has been applied under said pattern, as shown in Figs. 3, 4, and 5, the enlarged portions 12 of the pins 11 on said jig will enter the openings 3 in the lug portions 2' on said pattern. After this is done the semi-circular bearing portions 20 are each placed in the semi-circular portions 3' of the openings 3 on the pattern 1 and against the enlarged portions 12 on the pins 11 in said opening, so that any suitable filling material, such as the Babbitt metal 21 can be placed around said bearing portions 20 in the portions 3' of said openings to hold said bearing portions in place, and after which the jig 7 and pins are removed to form the pattern seats or guides 18' in said portions 20 for the reception of the dowel pins hereinafter described and from the holes 18 in the spools 16. In forming the guides for the flask 4, four of the complete spools 16 like the one shown in Fig. 8 are employed, and these spools have their holes 18 slightly smaller in diameter than such holes for forming the guides 18' in the semi-circular bearing portions 20. After the jig 7 has been placed on the flask 4, so that the contracted lower ends or portions 13 on the pins 11 carried by said jig are within the holes 6 in the flange 5 of said flask, each of the spools 16 are placed in said holes and around said pin portions, and then a suitable filling material, such as the Babbitt metal 23 can be placed in the spaces 22 formed around said spools by said spools and holes to hold said spools in place, and after this is done the jig and pins are removed to form the flask guides or seats 18'' for the dowel pins hereinafter described.

The dowel pins are shown at 24 and they are each provided with an upper enlarged pointed end portion 25 and a lower contracted portion 26 thereon. These dowel pins 24 are adapted to fit by their contracted portions 26 within the guides or seats 18'' in the spools 16 of the flask 4 and are held in place therein by an edge or key 27 passing through a hole 28 in such portions 26 and bearing against the flange 5 of said flask. When the dowel pins 24 are thus in position on the flask 4, the pattern 1 can be lowered in the usual manner down onto the said flask, and in such lowering the guides or seats 18' in the bearing portions 20 on said pattern will engage with the enlarged portion 25 on said pins to guide said pattern to place on said flask, as well as forming such an enlargement during the raising of said pattern from said flask in the usual manner.

It will thus be seen that our improved method of forming guides in patterns or flasks will enable the formation of guides for the dowel pins in a true and correct line with each other by a single jig, so that when said pins are thus held by the flask the pattern will be guided to its proper position on said flask and be precisely matched therewith to form a mold which will enable an even thickness of metal to be had when the article is cast from such mold.

It will be evident that our improved method of forming guides in patterns or flasks can be applied for matching any flask or pattern, flasks and flasks, or patterns and patterns together, and its use will overcome the improper alinement and enlarging of the ordinary holes in these mold parts through casting and wear, while the method will also permit of the easy and rapid renewal of the spools for the bearing portions or guides for the pins and thereby prolong the life of the mold parts carrying the guiding means.

Various modifications and changes in the design, arrangement and construction of the devices for practicing our improved method of forming guides in patterns or flasks may be resorted to without departing from the spirit of the invention or sacrificing any of its advantages.

What we claim as our invention, and desire to secure by Letters Patent, is—

1. The method herein described of forming guide seats in a molding device, which consists, after openings have been formed in the molding appliance, in temporarily applying a jig to said appliance to determine the position of said guide seats relative to the mold to be formed, and then securing bearing members in said openings and around said jig to form said seats.

2. The method herein described of forming guide seats in a molding device, which consists, after openings have been formed in the molding appliance, in temporarily applying a jig having shouldered seat forming pins to said appliance to determine the position of said guide seats relative to the mold to be formed, and then securing bearing members in said openings and around said pins to form said seats.

In testimony whereof, we, the said JAMES H. DANVER and WILLIAM H. LOSE, have hereunto set our hands.

JAMES H DANVER.
WILLIAM H. LOSE.

Witnesses:
J. L. TREFALLER, Jr.,
J. N. COOKE.